United States Patent [19]

Butzow

[11] 3,915,852

[45] Oct. 28, 1975

[54] DIVIDING APPARATUS AND METHOD

[76] Inventor: George M. Butzow, 5527 S. Wayne Ave., Fort Wayne, Ind. 46807

[22] Filed: Sept. 21, 1973

[21] Appl. No.: 399,394

[52] U.S. Cl. .................. 209/253; 209/316; 198/68
[51] Int. Cl.² ............................................. B02B 1/42
[58] Field of Search .......... 209/253, 316, 315, 245, 209/254; 222/330; 198/68, 81

[56] References Cited
UNITED STATES PATENTS

| | | | |
|---|---|---|---|
| 149,850 | 4/1874 | Gathmann | 209/316 |
| 510,768 | 12/1893 | Bisbee | 209/245 X |
| 1,051,157 | 1/1913 | Owens | 209/316 |
| 2,908,391 | 10/1959 | Frevert | 209/315 |
| 3,022,089 | 11/1971 | Quinn | 209/315 X |
| 3,077,266 | 2/1963 | Plumb | 209/317 |
| 3,388,797 | 6/1968 | Herman | 209/317 X |

FOREIGN PATENTS OR APPLICATIONS

| | | | |
|---|---|---|---|
| 602,313 | 4/1932 | Germany | 209/254 |

Primary Examiner—Robert Halper

[57] ABSTRACT

A dividing apparatus and method of dividing a continuously flowing stream of particulate material into two separate streams. The apparatus, in a specific embodiment, is used with a plural deck screen, the apparatus being secured over the loading end of a screen deck, a first screen deck being positioned beneath the second screen with its loading end disposed beneath but displaced from the loading end of the second screen deck such that the loading ends of both screens are exposed from above. The divider has an impingement surface upon which a continuously flowing stream of particulate material is directed, a portion of the stream passes the impingement surface and is deposited upon the loading end of the second screen deck, the remainder impinges on the divider and is deposited upon the loading end of the first screen deck.

9 Claims, 5 Drawing Figures

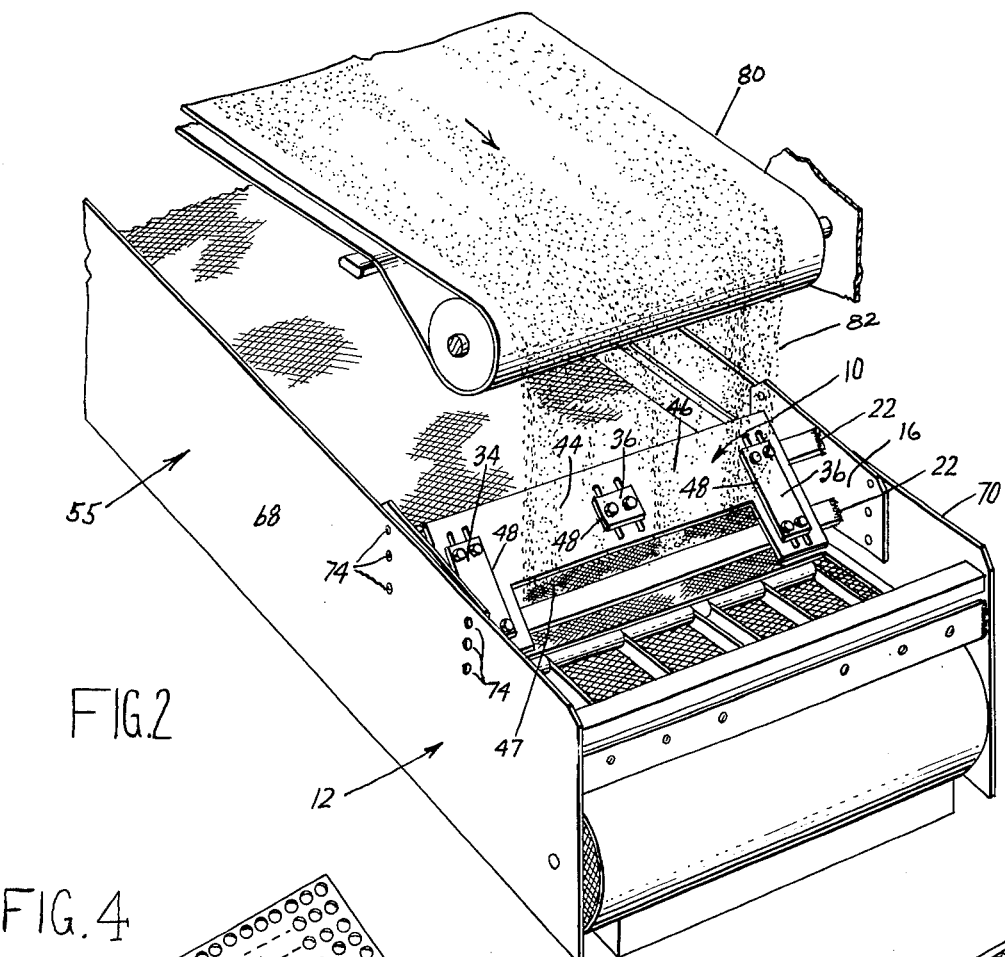

DIVIDING APPARATUS AND METHOD

BACKGROUND OF THE INVENTION

1. Field of the Invention

This invention relates to a dividing apparatus for use in dividing a continuously flowing stream of particulate material into two smaller streams and a method for using the same, and more particularly to a screen including the dividing apparatus by which a portion of a continuously flowing stream of particulate material may be screened through a fine screen, the remainder being screened through a coarser screen.

2. Description of the Prior Art

In foundries, mold sand, during use, is continuously circulated, often the mold sand is reused 6 or 8 times a day. Such sand is contaminated in use with metal, core butts, core wire and fragments thereof and if not removed therefrom may result in defective castings, injured personnel, and lost time. Some contaminents, and in non-ferrous foundries most contaminents, can only be removed by screening. However, mold sand varies in moisture content and thereby is difficult to screen. A portion of mold sand loaded on a screen slanted with respect to the horizontal will pass through the screen, the remainder will travel over the screen toward the lower end of the screen. The throughput of relatively dry mold sand through a screen is appreciably greater than the throughput of relatively moist sand. However, the additives which are conventionally used in mold sand and the amounts used vary, and the properties of the mold sand vary therewith. Thus, the capacity of a particular screen will vary with the particular mold sand used, and will also vary with the moisture of the mold sand. For these reasons, the finer impurities in mold sand which is continuously recycled cannot be completely removed by screening even when very large screens are used. Screens theoretically large enough are prohibitive in cost. Thus, these impurities tend to accumulate in the mold sand. Conventionally, the mold sand is either discarded when the buildup of impurities becomes too large or the continuous process is shut down and the mold sand is passed through an auxiliary fine screen at a relatively slow rate to remove the impurities. Both are costly procedures. Mold sand drying equipment large enough to effectively increase the throughput of the mold sand through a screen is also usually too costly to solve this problem.

It is therefore highly desirable to provide a means by which mold sand can be continuously screened to remove these impurities. To do so it has been found necessary to screen a random portion of the mold sand through a relatively fine screen and screen the remainder of the mold sand through a relatively coarse screen on each pass. By this technique the impurities can be kept at an acceptable level.

It is also highly desirable to provide an apparatus and method whereby this can be accomplished continuously so that there is no interruption in the use of the mold sand. Such a continuous process requires an apparatus by which the continuously flowing stream of mold sand can be divided to randomly select the portion to be fine screened. Conventional apparatus has not worked successfully in view of the varying moisture contents of the mold sand and the varying properties of the mold sand due to the moisture content. In general, when the mold sand is relatively dry and free flowing, there is little problem; however, when the mold sand is relatively wet, clogging and relatively small throughput are experienced. Also, it is highly desirable to provide such an apparatus which can be used with different mold sands the properties of which vary because of the additives added to the sand.

It is therefore highly desirable to provide a dividing apparatus which can be used with continuously flowing streams of particulate material varying from a free flowing stream to a stream highly susceptible to clogging. Also, such an apparatus should vary the random sample divided out from the remainder of the stream inasmuch as such is required by continuous processes, i.e., to match the throughputs of the mold sand screening apparatus above-described with the overall flow of mold sand through the process. As above-mentioned, such an apparatus should also be adjustable so as to be operable with a variety of mold sands having differing flow properties.

It is finally highly desirable to provide a dividing apparatus for use with such materials as mold sand in conjunction with apparatus other than screens, such as conveyors, dryers, crushers and the like, which may be used with continuous processes and may require dividing from a continuous flowing stream of particulate material at random sample.

SUMMARY OF THE INVENTION

It is therefore a primary object of the invention to provide an improved apparatus for dividing a continuous flowing stream of particulate material.

Another object of this invention is to provide an improved apparatus for dividing a random sample from a continuously flowing stream of particulate material having varying flow properties.

Another object of this invention is to provide an improved method of dividing a continuously flowing stream of particulate matter.

Another object of this invention is to provide an improved method of randomly sampling a continuous flowing stream of particulate matter.

Yet another object of this invention is to provide an improved screen for removing impurities from a continuously flowing stream of foundry mold sand.

A further object of this invention is to provide an improved screen having both relatively fine and relatively coarse screens and the divider of the invention by which a random sample of a continuously flowing stream of particulate material can be finely screened, the remainder being coarsely screened.

In the broader aspects of this invention, there is provided an apparatus for dividing a continuously flowing stream of particulate material having an upwardly facing impingement surface at which a portion of the stream is directed, a first receiver mounted directly beneath the divider and a second receiver positioned to receive the portion of the particulate material impinging on the divider surface. Also, the invention includes a method of impinging a continuously flowing stream of particulate material on an upwardly facing impingement surface of a divider, placing a first receiver beneath said divider to receive a portion of the stream and placing a second receiver to one side of said divider to receive the remainder of the stream, and a screen apparatus at which the divider of the invention is mounted over a relatively fine screen and to receive the random sample of a continuously flowing stream of particulate material, and a relatively coarse screen for receiving the remainder of the stream.

The word "screen" is used generically herein as is the word "receiver" to refer generically to those apparatus that are most useful with the dividing apparatus of the invention. Since the dividing apparatus of the invention divides a continuously flowing stream of particulate material into two portions, the size of those portions varying in accordance with the flow properties of the particulate material, the dividing apparatus and method of the invention is most useful with "receivers" or "screens" which have a capacity which also varies as the flow properties of the particulate material varies, i.e. more capacity with a more flowable particulate material and less capacity with a less flowable particulate material. The screen illustrated in the drawing is only a specific embodiment of those "receivers" and "screens" with which the dividing apparatus and method of the invention are most useful. As disclosed hereinafter, other such apparatus include conveyors (conveyors of a capacity in which the conveyor will be overloaded when the particulate material is more flowable and adequate when the particulate material is less flowable) and other materials handling equipment.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 2 is a perspective and fragmentary view of the apparatus illustrated in FIG. 1;

FIG. 3 is an exploded and perspective view of the dividing apparatus of the invention; and FIGS. 4 and 5 show alternatives to the plate 28 shown in FIG. 3.

DESCRIPTION OF THE PREFERRED EMBODIMENT

Figure 1:
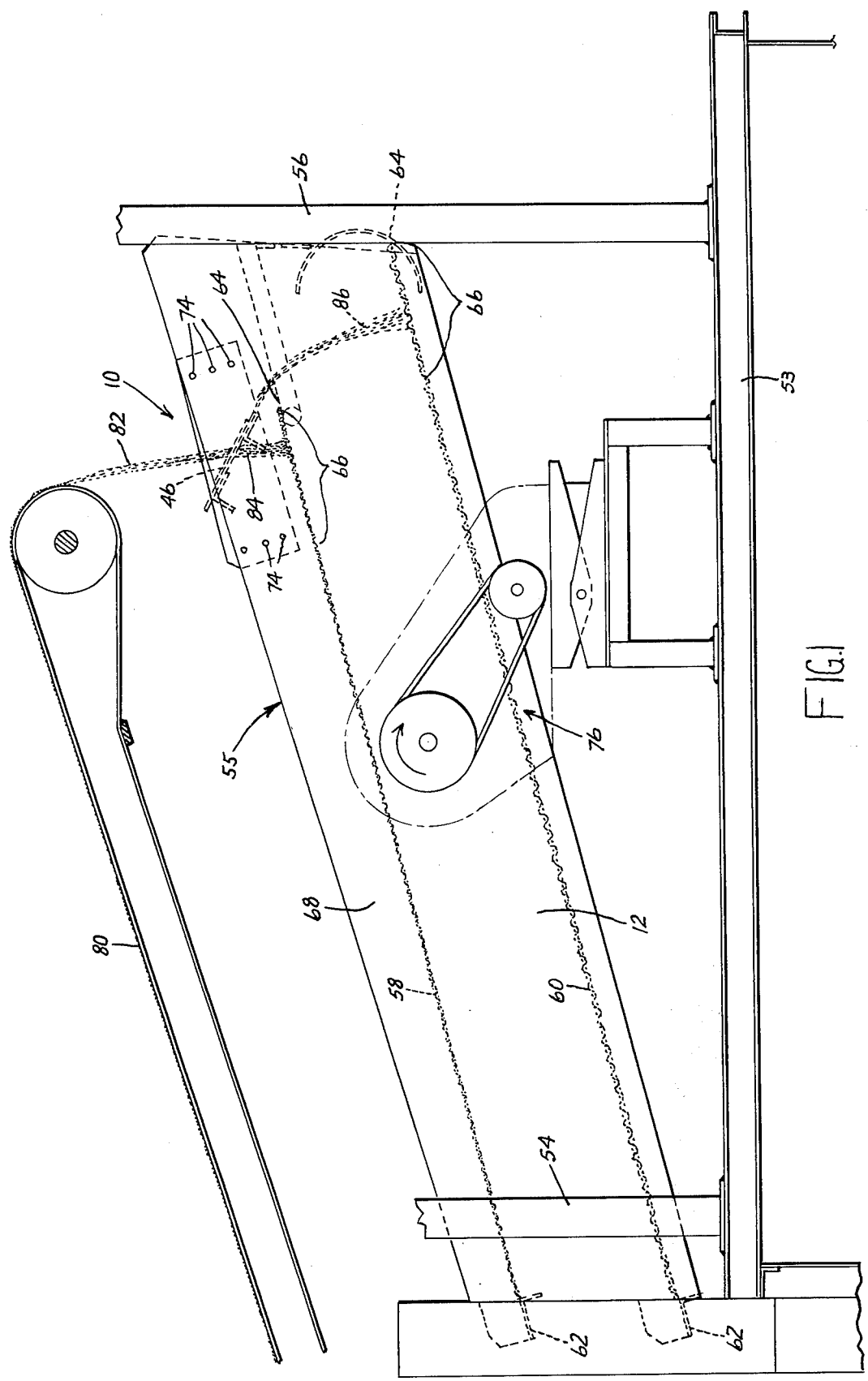
FIG. 1 is a side view of the dividing and screen apparatus of the invention, partially broken away and partially schematically illustrated.

It has been discovered that a random sample of a continuously flowing stream of foundry mold sand can be divided from the remainder of the stream by impinging the stream on a dividing apparatus having an upwardly facing impingement surface having an opening therein which defines a plane angularly disposed to the horizontal. A random sample will pass through the opening and the remainder of the stream will impinge upon the surface and travel downwardly toward the lower edge of the surface. By this means, the random sample can be deposited upon a receiver located beneath the dividing apparatus and the remainder of the stream can be directed toward another receiver. The receivers may be conveyors, screens or the like as above-mentioned. The impingement surface may be a surface of a plate having a single large opening therein, the surface of a perforated plate having a plurality of smaller openings therein, or the surface of a mesh material. In all cases, the size of the openings must be chosen to obtain the desired results with a particular mold sand. At the present state of the art, this choice is made by trial. Once this choice is made, the size of the random sample is automatically decreased when the moisture content of the mold sand is relatively high, and is automatically increased in size when the mold sand becomes relatively dry.

Referring to the drawings, there is shown the dividing apparatus 10 of the invention in conjunction with the screen apparatus 12 of the invention. The divider 10 comprises a frame 14 comprising two identical and opposite frame and members 16 and two elongated frame members 18 and 20. Frame members 18 and 20 have opposite ends 22 which are secured to members 16, respectively, by welding or the like as shown. Members 18, 20 are arranged so as to extend parallel to each other and are of the same length. By securing one member 16 to one end 22 of each of the members 18, 20 and the other member 16 to the other ends 22 of the members 18, 20 as shown in FIG. 3, members 16 are also spaced apart and parallel to each other.

Members 18 and 20 each have an upwardly facing surface 24 which, when members 18, 20 are secured to members 16, define a common plane which for reference purposes will be given the reference numeral 26.

Mounted on the surfaces 24 of the members 18, 20 is a plate 28. The specific mounting means is shown to include bolt holes 30 in the members 18, 20, slots 32 in the plate 28, securing elements 34, 36, bolt holes 40 in elements 34, 36, and bolts 38. The bolt holes 30 are threaded so as to receive the threaded portion of the bolts 38. As assembled, plate 28 is positioned on the surfaces 24 of the members 18, 20, the bolts 38 are positioned through bolt holes 40 of elements 34 and 36, through slots 32 of the plate 28 and threaded into the bolt openings 30 of members 18, 20. By this means of securance, the plate 28 can be positioned at any desired position including those positions at which the bolts 38 are at the opposite ends of the slots 32 of the member 28 and at any position therebetween by loosening the bolts 38, positioning the member 28 as desired, and securing the same by retightening the bolts 38.

Referring now specifically to FIG. 2, the divider 10 is shown having an upwardly facing impingement surface 44. Surface 44 is in part made up of the upwardly facing surface 46 of the member 28, surface 24 of a portion of the member 20 and the upwardly facing surfaces 48 of the securing elements 34 and 36. The impingement surface 44 is shown to have a rectangular opening 47 therein defined by a longitudinal edge 49 of the member 20 and the edges of plate 28 formed by cutting away a rectangular portion from the rectangular plate 28; namely, a longitudinally extending edge 50 and two spaced apart and facing edges 52. When plate 28 is mounted in the members 18, 20, edges 49 and 50 are parallel and edges 52 extend transversely of the edges 49, 50.

It can be seen that the opening 47 can be adjusted to size by moving the plate 28, in the manner aforedescribed, toward and away from the edge 49 of the member 20. The purpose for this adjustment is explained elsewhere.

Alternatively, a perforated plate 28a having a plurality of openings 47a or a framed wire mesh material 28b having mesh opening 47b can be substituted for plate 28. In all embodiments, the size of the openings 47, 47a and 47b will be chosen by prior trial to give the appropriate results with a specific foundry mold sand. The securance of both the perforated plate and the mesh to the members 18, 20 can be by any conventional means or by the securing elements 34, 36 as desired. It may further be desirable to narrow surfaces 24 of the members 18, 20 when using either plate 28a or mesh material 28b. The best mode now contemplated comprises plate 28 in view, in part, to the adjustability of the size of the opening 47.

The divider 10 as shown in FIGS. 1 and 2 can be used on screen apparatus 12 with good results. The screen apparatus 12 is particularly useful for screening foundry mold sands of foreign matter continuously as a part of a continuous molding process in which the mold sand is continuously circulated, used and reused. However, it will also be obvious that the divider of the dividing apparatus of the invention will have other uses in which a continuously flowing stream of particulate matter must be divided into two streams or which a random sample is desirably made of a continuously flowing stream. The divider is equally useful with a pair of conveyors, as well as the screens disclosed hereinbelow and in general can be used with other materials handling equipment.

Referring to FIGS. 1 and 2, the divider 10 is shown mounted on a multi-layered screen 12. The screen 12 has a frame consisting of a base 53 having spaced-apart upstanding support members 54 and 56. Mounted on the support members 54 and 56 is screen assembly 55 having two generally parallel screen decks 58 and 60. Screen decks 58 and 60 are elongated, having opposite spaced-apart ends 62 and 64. Adjacent ends 64 are loading zones 66. Ends 62 are discharge ends of both decks 58, 60.

Screen assembly 55 also includes spaced-apart and parallel side members 68 and 70. Decks 58 and 60 are bounded at their longitudinally extending edges by side members 68 and 70. Deck side members 68 and 70 extend generally from end 62 to end 64 of screen deck 60. However, screen deck 58 is shorter than deck 60 as shown to expose loading zone 66 of the screen deck 60 from above.

The entire screen assembly 55 comprising the screen decks 58, 60 side members 68 and 70 are shown to be mounted on the frame with ends 64 at a higher elevation than the discharge end 62. Similarly, the divider assembly 10 is secured to the assembly 55 by securing the opposite end plates 16 to the side members 68 and 70, respectively, by bolts 74 as shown or other fastening means. As shown in FIGS. 1 and 2, an impingement surface 44 of the divider also forms an angle with the vertical. The entire screen assembly 55 is resiliently mounted (not shown) to the frame 53 and is connected to a vibrating mechanism 76 shown schematically in FIG. 1. This mechanism may be conventional in all respects. By this mechanism, both screen decks 58 and 60 and the divider 10 are shaken during operation.

While vibrating the divider 10 is preferred when the screen 12 is used with foundry mold sand, the divider 10 in another embodiment for use with free flowing particulate materials can be rigidly mounted to the screen base 53 and advantageously used without the divider 10 being vibrated.

In the specific embodiment in which the screen 12 as shown in FIGS. 1, 2 and 3 is used to continuously screen impurities from a continuously flowing stream of foundry mold sand, screen deck 58 is provided with a screen of a mesh material and screen deck 60 is provided with a screen of mesh material. Both decks are planer and are slanted to form an angle with the horizontal. In a specific embodiment, it has been found that the divider 10 functions properly with the impingement surface 46 forming an angle of about 65° with a vertical. Additionally, it has been found that an opening 47 having a longitudinal dimension of 32 inches and having a maximum transverse dimension of 4 inches and a minimum transverse dimension of ½ inch is functional with foundry mold sand provided the slope of screen decks 58 and 60 form an angle ranging from 15 to 25 degrees with a horizontal when the vibrating mechanism 76 is rotated in the direction of the arrow shown in FIG. 1 or the slope of screen decks 58 and 60 define an angle with a horizontal ranging from 4 to 8 degrees with the rotation of the vibrating mechanism 76 in the opposite direction. A change in the angle defined by the impingement surface 44 with a vertical, maintaining all of the other variables mentioned in this paragraph constant, including the mold sand with which the invention is used, will require the size of the opening 47 to be adjusted to result in the invention functioning as desired.

In operation, a stream of particulate material 82 is continuously delivered onto the impingement surface 44 by a conveyor 80. Particulate material 82 is divided by the divider 10 into a random sample 84 of the stream 82 which passes through the opening 47 and is deposited on the loading zone 66 of the screen deck 58. The remaining portion 86 of the stream 82 impinges on the impingement surface 44 jumps the openings 47, 47a or 47b and is deposited on the loading zone 66 of the screen deck 60. By operation of the vibrating mechanism 76, screen decks 58, 60 are shaken and the particulate materials 84, 86 are screened as they progress towards the discharge ends 62 thereof.

The optimum throughput of the screen 12 is achieved when the entire length of the screen deck 58 is used. Since the screen of the screen deck 58 is of finer mesh than the screen deck 60, the throughput of the screen deck 58 will control the size of the random sample 84 selected from the stream 82 by the divider 10. The size of the opening 47 will determine the performance of the divider 10 with a particular foundry mold sand. Since the flow properties of foundry mold sand vary with the additives used with the sand, the size of the opening 47 must be chosen for a specific mold sand to be used. As above-mentioned, choice is by trial. Once the choice is made, the divider 10 will function so as to deposit the appropriate sized random sample onto the screen deck 60. The size of this sample will be larger when the mold sand is relatively dry than when the mold sand is relatively wet. Irrespective of the moisture content of the mold sand, the entire screen deck 60 will be used thereby removing the impurities from the mold sand in a highly efficient manner.

The method of the invention comprises the steps of impinging a continuously flowing stream 82 of particulate material on the upwardly facing surface of the divider 10 mounted over the loading zone 66 of a screen deck 58, or another receiver such as a conveyor, or the like; placing a second receiver under the first receiver so as to extend beyond the end 64 of the screen deck 58 so as to receive the remaining portion 86 of the stream 82 impinging upon the impingement surface 44. The method further includes the adjustment of the size of the opening 47 of the divider 10, the adjustment of the angle which the impingement surface 44 defines with a vertical, adjusting the angle which the screen decks 58 and 60 define with a horizontal, and the vibrating of the divider 10 by rotating the vibrating mechanism counter to the flow of the particulate material on screen decks 58 and 60 or in the reverse directions. While the vibrating of the divider 10 is preferred, it is not essential to the invention.

While there have been described above the principles of this invention in connection with specific apparatus, it is to be clearly understood that this description is made only by way of example and not as a limitation to the scope of the invention.

What is claimed is:

1. An apparatus for use with a continuously flowing stream of particulate material having varying flow properties comprising a frame, a first screen mounted on said frame, a second screen mounted on said frame over said first screen, said second screen having a peripheral boundary thereof disposed over said first screen whereby both said second screen and a portion of said first screen are exposed from above, a divider mounted on said frame adjacent to said second screen peripheral boundary, said divider having an impingement surface thereon, said impingement surface having at least one opening therein, said impingement surface and a vertical defining an angle therebetween, whereby particulate material delivered on said divider will both pass through said opening and will impinge on said surface and be delivered onto said first and second screens, said screen on which said particulate material impinging on said surface is delivered having a larger capacity for said particulate material than the other screen, the capacity of said other screen on which said particulate material passing through said opening is deposited changing as the flow properties of said particulate material changes, said other screen capacity being less with less flowable material being more with more flowable material, said particulate material delivered onto said other screen being generally commensurate with said capacity of said other screen.

2. The apparatus of claim 1 wherein said angle defined by said impingement surface and said vertical is about 65°.

3. The apparatus of claim 1 wherein said impingement surface of said divider has an area sufficiently large to have the entire delivery of the particulate material delivered onto said divider within the boundaries of said impingement surface, and wherein said opening is substantially larger than the particle size of said particulate material.

4. The apparatus of claim 3 wherein both of said screens include a deck of mesh material, said other screen being of the finer mesh.

5. The apparatus of claim 4 wherein said first and second screens are elongated and have spaced apart loading and discharge ends, said second screen loading end being positioned over said first screen loading end, said second screen loading end also being adjacent to but displaced from said first screen loading end, thereby to expose both said first and second screen loading ends from above and wherein said divider is mounted over said second screen loading end.

6. The apparatus of claim 5 wherein said elongated first and second screens extend in the same direction, said second screen being over said first screen with said first screen loading end extending beyond said loading end of said second screen, said impingement surface extending transversely of the longitudinal direction of said screens over the entire width thereof.

7. The apparatus of claim 6 wherein said divider comprises an elongated element extending across said second screen adjacent to said second screen loading end, an elongated plate member extending in the same direction as said element and having opposite ends, two leg members secured to said opposite plate ends to extend from said opposite ends, respectively, transversely thereof in the same direction, said leg members being adjustably secured to said element, said plate member and its leg members and said element having an upwardly facing impingement surface thereon and defining therebetween said opening therein.

8. The screen of claim 4 further comprising means for selectively varying the size of said divider opening, and means for vibrating said divider.

9. A method of dividing a stream of particulate material comprising the steps of impinging a portion of a stream of particulate material on an upwardly facing surface of a divider and onto a first screen, said divider having at least one opening therein of a size substantially larger than the particle size of said particulate material, mounting a second screen directly beneath said divider, passing the remainder of said stream through said opening onto said second screen said second screen having a capacity which changes as the flow properties of said particulate material changes, said second screen capacity being less with less flowable material and being more with more flowable material, wherein all of said stream either impinges on said surface, or passes through said opening, said remainder varying in size as the capacity of said second screen varies, whereby said second screen is not overloaded, and further comprising the step of vibrating both said screens and said divider.

* * * * *

UNITED STATES PATENT OFFICE
CERTIFICATE OF CORRECTION

Patent No. 3,915,852　　　　　　　　Dated October 28, 1975

Inventor(s) George M. Butzow

It is certified that error appears in the above-identified patent and that said Letters Patent are hereby corrected as shown below:

Column 4, line 8 change "and" to -- end --.

Column 8, line 41 add a comma after "screen" and before "said".

Signed and Sealed this

Seventeenth Day of August 1976

[SEAL]

Attest:

RUTH C. MASON
*Attesting Officer*

C. MARSHALL DANN
*Commissioner of Patents and Trademarks*